United States Patent
Losh et al.

(10) Patent No.: US 11,625,127 B2
(45) Date of Patent: *Apr. 11, 2023

(54) SYNCHRONIZING INPUT SENSING WITH DISPLAY UPDATING

(71) Applicant: Synaptics Incorporated, San Jose, CA (US)

(72) Inventors: Jonathan Losh, Mountain View, CA (US); Dipankar Talukdar, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,461

(22) Filed: Jan. 7, 2022

(65) Prior Publication Data
US 2022/0129136 A1  Apr. 28, 2022

Related U.S. Application Data

(63) Continuation of application No. 17/107,582, filed on Nov. 30, 2020, now Pat. No. 11,256,366.

(60) Provisional application No. 62/964,511, filed on Jan. 22, 2020.

(51) Int. Cl.
  *G06F 3/041* (2006.01)
  *G06F 3/044* (2006.01)

(52) U.S. Cl.
  CPC ........ *G06F 3/04184* (2019.05); *G06F 3/0441* (2019.05); *G06F 3/04162* (2019.05); *G06F 3/04186* (2019.05)

(58) Field of Classification Search
  CPC .............. G06F 3/04184; G06F 3/0441; G06F 3/04162; G06F 3/04186
  See application file for complete search history.

(56) References Cited

U.S. PATENT DOCUMENTS

| | | |
|---|---|---|
| 9,804,213 B2 | 10/2017 | Reynolds et al. |
| 9,965,105 B2 | 5/2018 | Hoch et al. |
| 10,540,043 B2 | 1/2020 | Tanemura et al. |
| 10,775,927 B2 | 9/2020 | Wang et al. |
| 11,061,521 B2 | 7/2021 | Fotopoulos et al. |
| 2015/0015528 A1 | 1/2015 | Vandermeijden |
| 2015/0049043 A1 | 2/2015 | Yousefpor |

(Continued)

*Primary Examiner* — Lisa S Landis
(74) *Attorney, Agent, or Firm* — Leydig, Voit & Mayer, Ltd.

(57) ABSTRACT

A processing system configured to receive a first display control signal corresponding to a non-display update period of a display frame and a second display control signal corresponding to a display update period of the display frame. The processing system is further configured to acquire, based on receipt of the first display control signal, first resulting signals from sensor electrodes electrically connected to the sensor driver by operating the sensor electrodes for a first type of input sensing during a first period overlapping with at least a portion of the non-display update period. Further, the processing system is configured to acquire, based on receipt of the second display control signal, second resulting signals with the sensor electrodes by operating the sensor electrodes for a second type of input sensing during a second period overlapping with at least a portion of the display update period.

20 Claims, 6 Drawing Sheets

(56) References Cited

U.S. PATENT DOCUMENTS

2016/0154507 A1* 6/2016 Bharathan ............. G06F 3/0441
                                                          345/174
2017/0192605 A1   7/2017 Goudarzi
2021/0041988 A1   2/2021 Fotopoulos et al.

* cited by examiner

SYNCHRONIZING INPUT SENSING WITH DISPLAY UPDATING

CROSS REFERENCE TO RELATED APPLICATIONS

This application claims priority to U.S. patent application Ser. No. 17/107,582, filed on Nov. 30, 2020, and claims the benefit of U.S. provisional patent application Ser. No. 62/964,511, filed Jan. 22, 2020, each of which is hereby incorporated herein by reference.

BACKGROUND

Field

The disclosure herein is generally related to electronic devices, and more specifically, to operating sensing devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in other computing systems, such as touch screens integrated in cellular phones and multimedia entertainment systems of automobiles and the like.

SUMMARY

In one example, a processing system comprises a sensor device. The sensor device is configured to receive a first display control signal corresponding to a non-display update period of a display frame and a second display control signal corresponding to a display update period of the display frame. The sensor device is further configured to acquire, based on receipt of the first display control signal, first resulting signals from sensor electrodes electrically connected to the sensor driver by operating the sensor electrodes for a first type of input sensing during a first period. The first period overlaps with at least a portion of the non-display update period. Further, the sensor driver is configured to acquire, based on receipt of the second display control signal, second resulting signals with the sensor electrodes by operating the sensor electrodes for a second type of input sensing during a second period. The second period overlaps with at least a portion of the display update period. The second type of input sensing differs from the first type of input sensing.

In one example, a method for input sensing comprises receiving, at a sensor driver, a first display control signal corresponding to a non-display update period of a display frame and a second display control signal corresponding to a display update period of the display frame. The method further comprises acquiring, based on receipt of the first display control signal, first resulting signals with sensor electrodes by operating the sensor electrodes for a first type of input sensing during a first period. The first period overlaps with at least a portion of the non-display update period. Further, the method comprises acquiring, based on receipt of the second display control signal, second resulting signals with the sensor electrodes by operating the sensor electrodes for a second type of input sensing during a second period. The second period overlaps with at least a portion of the display update period. The second type of input sensing differs from the first type of input sensing.

In one example, an input device comprises sensor electrodes, and a processing system electrically connected to the sensor electrodes. The processing system is configured to receive a first display control signal corresponding to a non-display update period of a display frame and a second display control signal corresponding to a display update period of the display frame. The processing system is further configured to acquire, based on receipt of the first display control signal, first resulting signals with the sensor electrodes by operating the sensor electrodes for a first type of input sensing during a first period. The first period overlaps with at least a portion of the non-display update period. Further, the processing system is configured to acquire, based on receipt of the second display control signal, second resulting signals with the sensor electrodes by operating the sensor electrodes for a second type of input sensing during a second period. The second period overlaps with at least a portion of the display update period. The second type of input sensing differs from the first type of input sensing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In an input device comprising both a sensing device and a display device, interference generated by the display device negatively affects the ability of the sensing device to accurately detect input objects. For example, interference due to a display device may result in ghost input objects (e.g., false input objects or the incorrect determination of input objects) being reported by a sensing device. In various examples, display interference is mitigated by acquiring sensing data during periods that do not overlap with display updating as such sensing period are not adversely affected by display interference. The sensing data acquired during periods when display updating is not occurring may be utilized to mitigate the effects of display interference on the sensing data acquired while display updating is occurring.

The following detailed description is merely exemplary in nature and is not intended to limit the disclosure or the application and uses of the disclosure. Furthermore, there is no intention to be bound by any expressed or implied theory presented in the preceding background, summary, or the following detailed description.

The terms "coupled with," along with its derivatives, and "connected to" along with its derivatives, may be used herein, including in the claims. "Coupled" or "connected" may mean one or more of the following. "Coupled" or "connected" may mean that two or more elements are in direct physical or electrical contact. However, "coupled" or "connected" may also mean that two or more elements indirectly contact each other, but yet still cooperate or interact with each other, and may mean that one or more other elements are coupled or connected between the elements that are said to be coupled with or connected to each other. The term "directly coupled" or "directly connected" may mean that two or elements are in direct contact.

Figure 1:
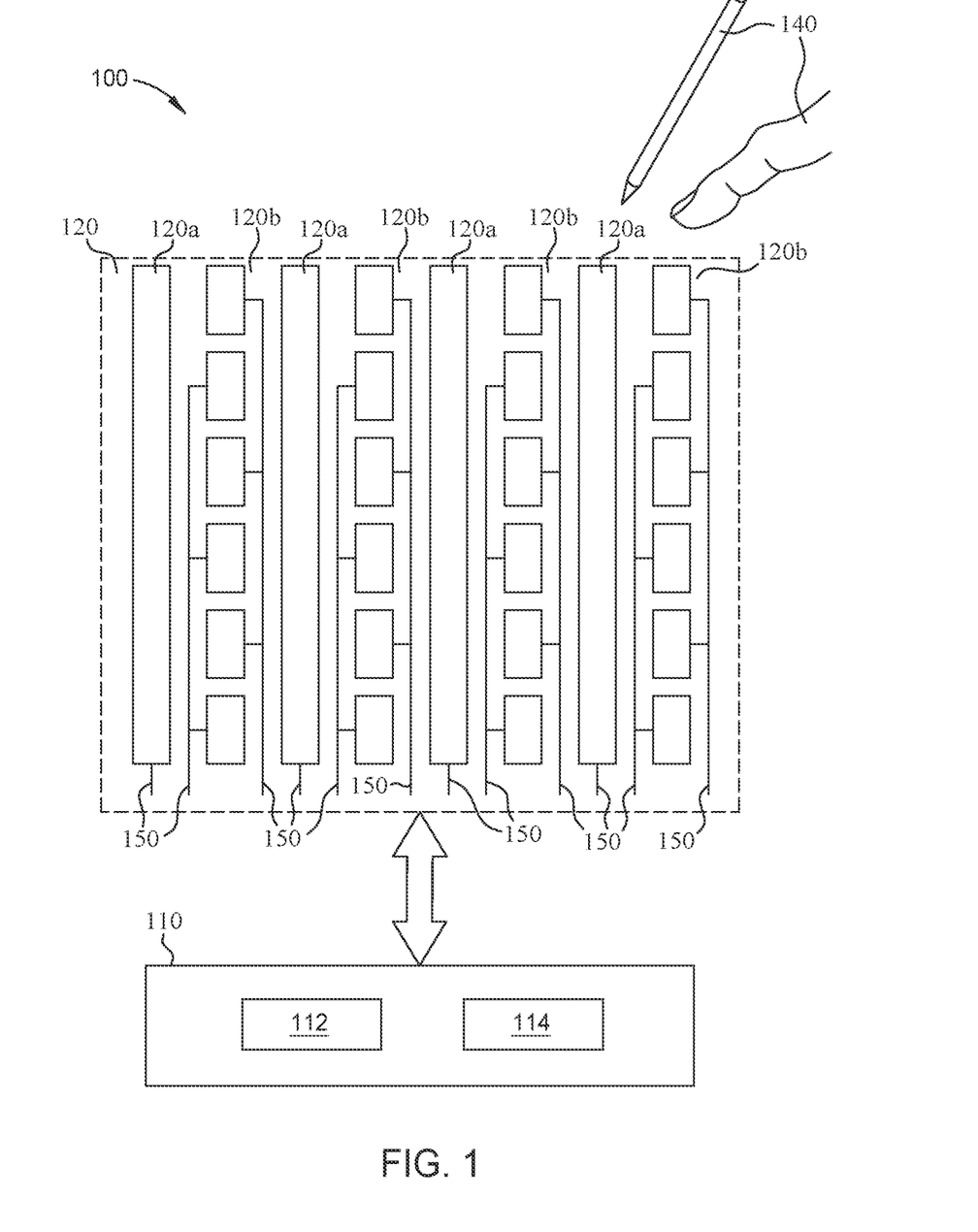
FIG. 1 is a schematic block diagram of an input device, according to one or more embodiments.

FIG. 1 illustrates an input device 100, according to one or more embodiments. The input device 100 includes a processing system 110 and sensor electrodes 120. The input device 100 is configured to provide input data corresponding to one or more input objects to an electronic system.

The electronic system may be one of a personal computer (e.g., a desktop computers, laptop computers, or netbook computers), a tablet, a mobile phone, and e-book readers, among others. Further, the electronic system may be an internet of things (IoT) device. In other embodiments, the electronic system is a multimedia controller of an automobile or other type of vehicle. The input device 100 may be integrated within a common housing with the electronic system, or separate housing from the electronic system. In one embodiment, the electronic system may be referred to as a host device and a processor of the electronic system may be referred to as a host processor. The host processor may be a central processing unit (CPU), a graphics processing unit (GPU), or another processor of the hot device. The input device 100 may communicate with parts of the electronic system using any combination of wired or wireless connections. In various embodiments, the input device 100 may be referred to as a touchpad, a touch screen, a touch sensor device and the like.

The input device 100 is configured to sense input associated with one or more input objects 140 in a sensing region of the input device 100. Example input objects 140 include fingers, electrical transmitters, and passive pens, among others, as shown in FIG. 1. Electrical transmitters may include devices that are external to the input device 100 and that are configured to transmit active device signals. Example electrical transmitters may include active pens, among others. The sensing region of the input device 100 encompasses any space above, around, in and/or near the input device 100 in which the input device 100 is able to detect user input, e.g., user input provided by one or more input objects 140. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, an input object 140 not in contact with any surfaces of the input device 100 may be in the sensing region and detected by the input device 100 and/or an input object 140 in contact with an input surface (e.g., touch surface) may be in the sensing region and detected by the input device 100. The input surface may be provided via a face sheet or a lens disposed over the sensor electrodes.

The processing system 110 comprises sensor circuitry 112. The sensor circuitry 112 is configured to operate the sensor electrodes 120 for capacitive sensing. For example, the sensor circuitry 112 is configured to drive the sensor electrode 120 with sensing signals and receive resulting signals from the sensor electrodes 120 for capacitive sensing. For example, in one embodiment, the sensor circuitry 112 includes transmitter circuitry configured to drive one or more of the sensor electrodes 120 for capacitive sensing to acquire resulting signals from one or more of the sensor electrodes 120. The transmitter circuitry may include driver circuitry and/or amplifier circuitry, among others. Further, the sensor circuitry 112 includes receiver circuitry configured to receive resulting signals from the sensor electrodes 120. The receiver circuitry may include one or more of analog front ends (AFEs), filter circuitry, sample and hold circuitry, analog to digital converter (ADC) circuitry, and/or demodulation circuitry, among others.

In one embodiment, the sensor circuitry 112 operates the sensor electrodes 120 for different types of sensing. For example, the sensor circuitry 112 operates the sensor electrodes 120 for transcapacitive sensing, absolute capacitive sensing, and/or active device (e.g., active pen) sensing.

In embodiments where the sensor circuitry 112 operates the sensor electrodes 120 for transcapacitive sensing (e.g., in a transcapacitive sensing mode), the sensor circuitry 112 may be configured to drive a first one or more of the sensor electrodes 120 with a transcapacitive sensing signal and receive resulting signals from a second one or more of the sensor electrodes 120. The resulting signals may comprise effects corresponding to the transcapacitive sensing signal. The sensor electrodes that are driven with the transcapacitive signal are modulated relative to the sensor electrodes that operated to receive the resulting signals. In one embodiment, the sensor electrodes that receive the resulting signals may be held at a substantially constant voltage or modulated different (e.g., different frequency, amplitude, and/or phase) from that of the sensor electrodes driven with the transcapacitive sensing signal.

The transcapacitive sensing signal has a varying voltage and is a periodic or aperiodic signal. Further, the transcapacitive sensing signal may be one of a square waveform, a sinusoidal waveform, a trapezoidal waveform, and a triangular waveform, among others. The transcapacitive sensing signal varies between two or more voltages. For example, the transcapacitive sensing signal may vary between a first voltage and a second voltage, where the second voltage is greater than the first voltage. In one embodiment, the first voltage may be in a range of about 0 V to about 5 V and the second voltage may in a range of about 5 V to about 10 V. However, in other embodiments, other voltages may be utilized. Further, the frequency of the transcapacitive sensing signal may be in a range of about 100 kHz to about 1 MHz. However, frequencies less than about 100 kHz and greater than about 1 MHz may be utilized.

In a transcapacitive sensing mode, the input object 140 affects the capacitive coupling (e.g., the transcapacitance) between two or more of the sensor electrodes 120. For example, the input object 140 may reduce the capacitive coupling between a sensor electrode driven with a transcapacitive sensing signal and one or more sensor electrodes operated to receive a resulting signal. The effects of the capacitance of the sensor electrode is reflected in the resulting signal.

In embodiments where the sensor circuitry 112 operates the sensor electrodes 120 for absolute capacitive sensing (e.g., in an absolute capacitive mode), the sensor circuitry 112 is configured to drive one or more of the sensor electrodes 120 with an absolute capacitive sensing signal and receive resulting signals from the driven sensor electrode or electrodes. The resulting signals comprise effects corresponding to the absolute capacitive sensing signal. Driving the sensor electrodes 120 with the absolute capacitive sensing signal comprises modulating the sensor electrodes 120 relative to a system ground of the input device 100. Further, driving the sensor electrodes 120 with the absolute capacitive sensing signal comprises modulating the sensor electrodes 120 relative to the input object 140.

The absolute capacitive sensing signal has a varying voltage and is a periodic or an aperiodic signal. Further, the absolute capacitive sensing signal may comprise one of a square waveform, sinusoidal waveform, trapezoidal waveform, and triangular waveform, among others. Further, the absolute capacitive sensing signal may vary between two or more voltages. In one embodiment, the absolute capacitive sensing signal varies between a first voltage and a second voltage. The first voltage may be in a range of about 0 V to about 5 V and the second voltage may be in a range of about 5 V to about 10 V. However, in other embodiments, other voltages may be used. In one or more embodiments, the absolute capacitive sensing signal has a frequency in a range of about 1 kHz to about 1 MHz. However, in other embodiments, frequencies of less than about 1 kHz or frequencies above 1 MHz may be utilized.

In an absolute capacitive sensing mode, the input object 140 affects the absolute capacitance of a sensor electrode 120 driven with an absolute capacitive sensing signal. For example, the input object 140 may increase the capacitance of the sensor electrode 120 driven with an absolute capacitive sensing signal. The effects of the capacitance of the sensor electrode 120 is reflected in the resulting signal.

The sensor circuitry 112 may operate one or more sensor electrodes 120 for transcapacitive sensing and absolute capacitive sensing. For example, the sensor circuitry 112 is configured to receive a resulting signal from a sensor electrode driven with a transcapacitive sensing signal. Additionally, the sensor circuitry 112 modulates a sensor electrode utilized to receive a resulting signal during transcapacitive sensing with an absolute capacitive sensing signal. In such an embodiment, the resulting signal comprises effects corresponding to the transcapacitive sensing signal and the absolute capacitive sensing signal. Further, in such embodiments, the absolute capacitive sensing signal differs from the transcapacitive sensing signal. For example, one or more of the waveform, frequency, amplitude, and phase of the absolute capacitive sensing differs from that of the transcapacitive sensing signal.

The sensor circuitry 112 operates the sensor electrodes 120 in an active device sensing mode to acquire an active device signal to detect an active device. In such embodiments, the input object 140 is an active device external to the input device 100 and transmits a signal to be acquired by the sensor circuitry 112 with the sensor electrodes 120. For example, the active device may be an active pen configured to transmit an active pen signal. The active device sensing mode may be referred to as an active pen sensing mode. Further, throughout the following disclosure where references are made to active pens, other active devices may be referenced instead.

The sensor circuitry 112 operates the sensor electrodes 120 to acquire a resulting signal comprising effects corresponding to an active pen signal from the input object 140. For example, the sensor circuitry 112 may hold one or more of the sensor electrodes 120 at a substantially constant voltage to receive a resulting signal that corresponds to the active pen signal.

The active pen signal is generated by a crystal oscillator disposed inside the active pen, although other mechanisms for generating signals may be used. The active pen signal has waveform parameters (e.g., frequency, amplitude, phase, etc.) which are predetermined and known by the input device 100. However, in other embodiments, the active pen signal has a waveform parameter that is unknown by the input device 100. The active pen signal is generated by the input object 140 external to the processing system 110. As such, one or more of the parameters of the active pens signal is unknown by the processing system 110. The active pen signal may be periodic or aperiodic. Further, the active pen signal may have a square waveform, sinusoidal waveform, a triangular waveform, or a trapezoidal waveform, among others. Additionally, the active pen signal may vary between two or more voltages. Further, the frequency of the active pen signal may be in a range of about 1 kHz to about 1 MHz. However, in other embodiments, the frequency of the active pen signal may be less about 1 kHz or greater than about 1 MHz. The active pen signal differs from that of the absolute capacitive sensing signal and the transcapacitive sensing signal. For example, one or more of the waveform, amplitude, frequency, phase, and number of voltage transitions of the active pen signal differs from that of the absolute capacitive sensing signal and the transcapacitive sensing signal. Further, one or more of the parameters of the active pen signal (e.g., frequency, amplitude, phase, and duty cycle) may be varied to identify different states of the active pen. For example, the active pen may alter the frequency of the active pen to indicate a change in a state of the active pen. The different states of the active pen may identify an input color, brush sizes/widths, tools (e.g., pencil, eraser), button press, and gesture inputs, among others.

The sensor circuitry 112 acquires the resulting signals during a capacitive frame. Further, during a capacitive frame, the sensor circuitry 112 operates the sensor electrodes 120 for one or more of transcapacitive sensing, absolute capacitive sensing, and active pen sensing to acquire the resulting signals.

As illustrated in FIG. 1, the processing system 110 includes a determination module 114. The determination module 114 is electrically connected to the sensor circuitry 112 and receives resulting signals from the sensor circuitry 112. The determination module 114 processes the resulting signals to determine changes in capacitance corresponding to one or more of the sensor electrodes 120 and/or parameters of an active pen signal. For example, the determination module 114 processes the resulting signals to determine changes in capacitance between one or more of the sensor electrodes 120 and the input object 140. Such changes in capacitance may be referred to as changes in absolute capacitance. The determination module 114 determines positional information of the input object 140 relative to the sensing region of the input device 100 based on the changes in capacitance between the one or more sensor electrodes 120 and the input object 140. For example, the determination module 114 determines presence and/or absence of the input object 140 based on the changes in capacitance between the one or more sensor electrodes 120 and the input object 140. Further, the determination module 114 determines a position (e.g., location) of an input object 140 within a sensing region of the input device 100 on the changes in capacitance between the one or more sensor electrodes 120 and the input object 140.

The determination module 114 processes the resulting signals to determine changes in a capacitance between two or more of the sensor electrodes 120. Such changes of capacitance may be referred to as changes transcapacitance or mutual capacitance. The determination module 114 determines positional information for the input object 140 relative to a sensing region of the input device 100 based on the changes in capacitance between two or more of the sensor electrodes 120. Further, the determination module 114 performs one or more correction algorithms on the changes in transcapacitance based on the changes in absolute capacitance. For example, the determination module 114 removes interference coupled by the input object 140 into the input device 100 from the changes in transcapacitance based on the changes in absolute capacitance. Additionally, or alternatively, when the input device 100 is operating in a low ground mass state, the determination module 114 adjusts the changes in transcapacitance based on the changes of absolute capacitance. The input device 100 may be determined to be operating in a low ground mass state when the input device 100 does not have sufficient ground (e.g., the input device 100 is on an insulated surface and not connected to ground). Adjusting the changes in transcapacitance comprises increasing and/or decreasing values according to the changes in transcapacitance based on the changes of absolute capacitance.

Additionally, or alternatively, the determination module 114 determines parameters of an active pen signal. For example, the determination module 114 determines positional information of the input object 140 relative to the sensing region of the input device 100 based on the received active pen signal. Further, the determination module 114 may determines state information of the active pen based on the received active pen signal.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In one embodiment, the determination module 114 processes the resulting signals by removing baseline measurements from the resulting signals. Baseline measurements compensate for a capacitive coupling between the sensor electrodes 120 and one or more nearby electrodes. The nearby electrodes may be display electrodes of a display device, unused sensor electrodes, and/or other proximate conductive objects. For example, the baseline measurements may account for display update signals (e.g., display update signals, gate select and deselect signals, or emission control signals) of a display device capacitively coupled to the sensor electrodes 120 via display electrodes of the display device. Removing the baseline measurements from the resulting signals may comprise subtracting the baseline measurements from the resulting signals or compensating for the baseline measurements in other ways.

The determination module 114 determines a capacitive image. For example, the determination module 114 determines a set of measurements of changes in capacitance from the processed resulting signals, and forms a capacitive image from the set of measurements. Additionally, or alternatively, profiles along each axis of the sensor electrodes 120 may be formed from the set of measurements. Successive capacitive images and/or profiles acquired over successive periods of time are used to track the motion(s) of one or more input objects 140 entering, exiting, and/or moving within the sensing region of the input device 100. Further, during each capacitive frame one or more capacitive images and/or profiles may be determined from the resulting signals. Additionally, or alternatively, profiles and/or capacitive images may be determined from a set of measurements determined from the received active pen signal. As is described above, in such embodiments, successive profiles and/or capacitive images are acquired over successive period of time are used to track the motion of an active pen entering, exiting, and/or moving within the sensing region of the input device 100.

The sensor electrodes 120 include the sensor electrodes 120a and 120b. The sensor electrodes 120a and 120b are formed from a conductive material. Further, the sensor electrodes 120a and 120b may be formed from a conductive material that is at least substantially transparent. For example, the sensor electrodes 120a and 120b may be formed from indium tin oxide (ITO), carbon nanotubes, or metal mesh, among others.

The sensor electrodes 120 form areas of localized capacitance. The areas of localized capacitance may correspond to capacitive pixels of a capacitive image. Capacitive pixels may be formed between an individual sensor electrode 120 and ground when the sensor electrodes 120 are operated for absolute capacitive sensing. Further, the capacitive sensing pixels may be formed between sensor electrodes 120 when the sensor electrodes 120 are operated for transcapacitive sensing.

As illustrated, the plurality of sensor electrodes 120 are disposed as a plurality of non-overlapping rectangles. In other embodiments, one or more of the sensor electrodes 120a overlaps one or more of the sensor electrodes 120b. The sensor electrodes 120a and 120b have a rectangular shape. However, in other embodiments, the sensor electrodes 120a and/or the sensor electrodes 120b have other shapes. As illustrated, the sensor electrodes 120a differ in size (e.g., width and/or length) from the sensor electrodes 120b. In other embodiments, the sensor electrodes 120a and 120b may be similar in size (e.g., a common width and/or length). Further, the shape of the sensor electrodes 120a may be the same or different from the shape of the sensor electrodes 120b.

The sensor electrodes 120 may be disposed in configurations other than illustrated in FIG. 1. For example, the sensor electrodes 120 may be disposed in polar arrays, repeating patterns, non-repeating patterns, non-uniform arrays, a single row or column, or other suitable arrangement. Further, the sensor electrodes 120 may be any shape such as circular, rectangular, diamond, star, square, nonconvex, convex, nonconcave, concave, etc. Further, the number of sensor electrodes 120 may differ from what is illustrated in FIG. 1. For example, the number of sensor electrodes 120a may be greater than or less than that illustrated in FIG. 1 and the number of sensor electrodes 120b may be greater than or less than that illustrated in FIG. 1. Further, the number of sensor electrodes 120a may be greater than, less than, or equal to the number of sensor electrodes 120b.

The sensor electrodes 120 are electrically coupled to the processing system 110 via traces 150. As illustrated in FIG. 1, the traces 150 are electrically connected to the sensor electrodes 120b in an alternating pattern. However, in other embodiments, the traces 150 may be electrically connected to the sensor electrodes 120b using other patterns.

In one or more embodiments, the sensor electrodes 120a and 120b may be disposed in a common layer (e.g., a common side of a substrate). For example, the sensor electrodes 120a and 120b are disposed in a non-overlapping fashion. In one embodiment, one of the sensor electrodes 120a and 120b include jumpers which cross over the other one of the sensor electrodes 120a and 120b.

In one or more embodiments, the sensor electrodes 120a are disposed on a first layer and the sensor electrodes 120b are disposed on a second layer different from the first layer. For example, in one embodiment, the sensor electrodes 120a are disposed on a first side of a substrate and the sensor electrodes 120b are disposed on a second side of the substrate. Alternatively, the sensor electrodes 120a are disposed on a first substrate and the sensor electrodes 120b are disposed on a second substrate.

Figure 2:
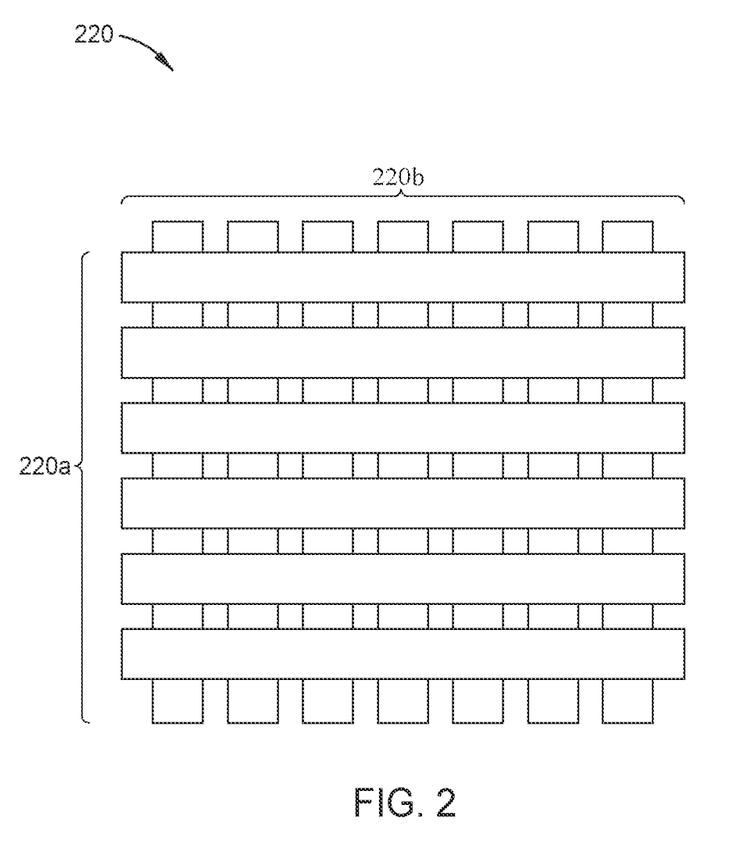
FIG. 2 is a schematic block diagram of sensor electrodes, according to one or more embodiments.

FIG. 2 illustrates sensor electrodes 220 disposed in a pattern different from that of the sensor electrodes 120. For example, the sensor electrodes 220 are disposed such that one or more sensor electrodes 220 overlaps another one or more of the sensor electrodes 220. As illustrated, each of the sensor electrodes 220a overlaps each of the sensor electrodes 220b. The sensor electrodes 220a and 220b may be disposed on different layers such that the sensor electrodes 220a overlap the sensor electrodes 220b. For example, the sensor electrodes 220a may be disposed on a first side of a substrate and the sensor electrodes 220b may be disposed on a second side of the substrate. Alternatively, the sensor electrodes 220a and 220b may be disposed on different substrates. The sensor electrodes 220 illustrate a different embodiment of the sensor electrodes 120, and throughout this disclosure, the sensor electrodes 220 may be utilized interchangeable with the sensor electrodes 120. For example, the sensor electrodes 220 may be coupled to the processing system 110 via traces 150, such that the sensor electrodes 220 are operated for absolute capacitive sensing, transcapacitive sensing, and/or active pen sensing.

Figure 3A:
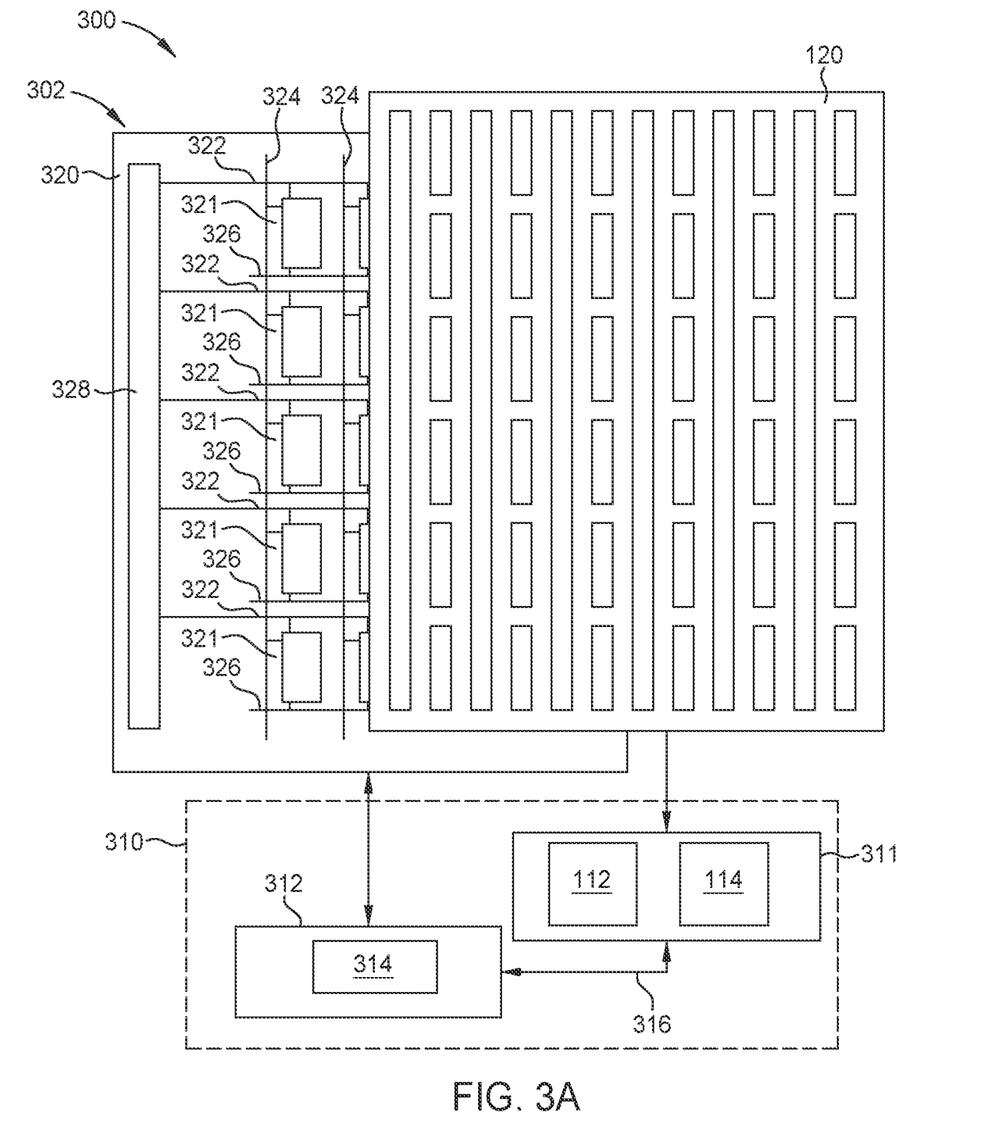
FIG. 3A is a schematic block diagram of an input device, according to one or more embodiments.

FIG. 3A illustrates an input device 300, according to one or more embodiments. The input device 300 is configured similar to that of the input device 100 of FIG. 1. For example, the input device 300 is configured to detect an input object (e.g., the input object 140) using the sensor electrodes 120. In other embodiment, the input device is configured to detect an input object using the sensor electrodes 220 illustrated in FIG. 2 instead of the sensor electrodes 120. However, as compared the input device 100, the input device 300 includes the display device 302. The display device 302 is one of a liquid crystal display (LCD) device or an organic light emitting diode (OLED) display device, among others.

The display device 302 includes the display panel 320 having subpixels 321. In embodiments where the display device 302 is an OLED display device, each subpixel 321 is coupled to a gate line 322, a data line 324, and an emission control line 326. In embodiments where the display device 302 is an LCD device, the emission control lines 326 may be omitted, and each subpixel is couple to a gate line 322 and a data line 324. Each subpixel 321 includes a pixel electrode and subpixel circuitry. The subpixel circuitry may include one or more capacitors and/or one or more transistors. The subpixel circuitry is configured to connect and disconnect the pixel electrodes from corresponding ones of the data line 324 for updating of the subpixels 321.

The gate lines 322 are coupled to gate select circuitry 328 of the display panel 320 and select (assert) and deselect (de-assert) subpixels 321 for display updating. For example, the gate select circuitry 328 may be configured to drive gate select and gate deselect signals onto the gate lines 322 to select and deselect the subpixels 321 for display updating. The gate select signals may be referred to as gate high signals ($V_{gh}$) and gate deselect signals may be referred to as gate low signals ($V_{gl}$). In such embodiments, $V_{gh}$ may have a value in a range of about 10 V to about 15 V. Further, $V_{gl}$ may have a value of about −5 V to 5 V. However, in other embodiments, other voltage values for $V_{gh}$ and/or $V_{gl}$ may be utilized.

The gate select circuitry 328 drives a first gate line 322 with a gate select signal to select each subpixel 321 coupled with the first gate line 322. Further, the gate select circuitry 328 drives a second gate line 322 with a gate deselect signal to deselect each subpixel coupled with the second gate line 322. The gate select circuitry 328 may also drive each gate line 322 other than the gate line driven with the gate select signal with the gate deselect signal. The gate select circuitry 328 may include one or more shift registers configured to drive the gate lines 322 with the gate select signal and the gate deselect signal.

The processing system 310 includes sensor driver 311 and a display driver 312. The sensor driver 311 includes the sensor circuitry 112 and the determination module 114, which are described in more detail with regard to FIG. 1.

The display driver 312 includes the display driver circuitry 314 that is configured to drive the data lines 324 with display update signals to update the subpixels 321. The display driver circuitry 314 comprises one or more source drivers, digital to analog converters (DACs), and amplifiers, among other circuit elements. In such embodiments, each source driver may be coupled to one or more of the data lines 324 and is configured to drive the data lines 324 with display update signals to update the selected subpixels 321.

The subpixels 321 are driven for display updating during a display frame. During a display frame, each of the subpixels 321 is driven with a respective display update signal to update the display panel 320. Display frames may occur at a display frame rate. Example display frame rates may be 30 Hz, 60 Hz, 90 Hz, 120 Hz, 240 Hz, or 360 Hz. However, other display frame rates may be utilized. During each display frame, the subpixels 321 are updated display line by display line, such that one display line is updated at a time. A display line corresponds to a row (or another grouping) of the subpixels 321 that are coupled to a common gate line or lines 322. Further, the period of time that is utilized to update a display line may be referred to as a display line update period. A display line update period may have a length of about 6 µs to about 9 µs. However, the display line update period may have a length of less than 6 µs or greater than 9 µs.

Figure 3B:
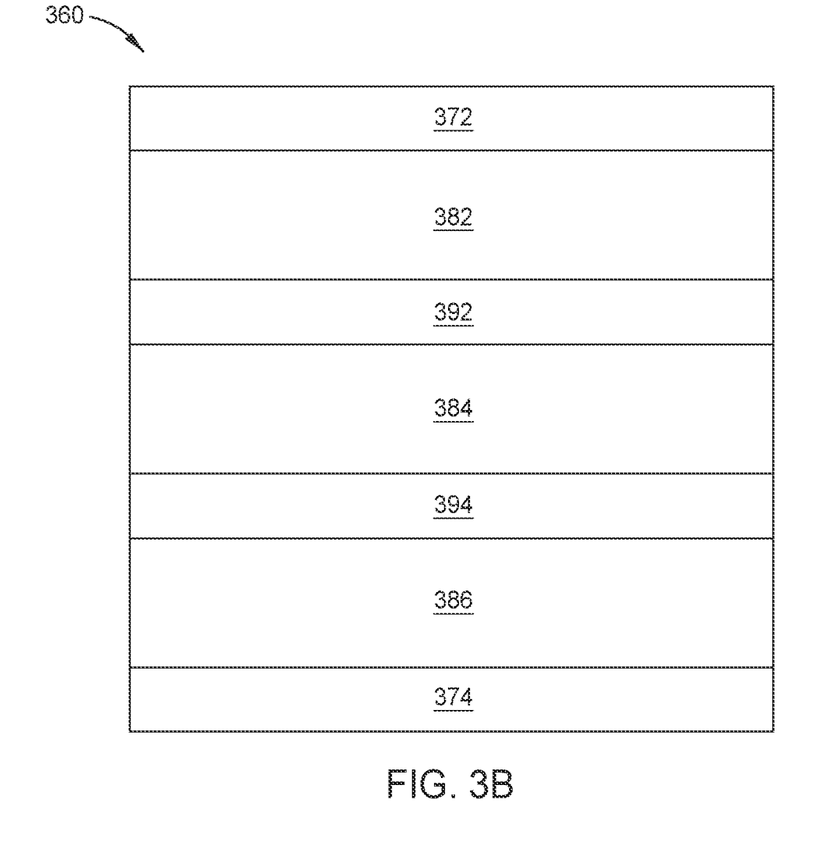
FIG. 3B illustrates a display frame, according to one or more embodiments.

FIG. 3B illustrates example drive blocks of a display frame 360. As illustrated, the display frame 360 includes vertical blanking periods 372, 374, and display update periods 382, 384, and 386. During the display update periods 382, 384, and 386, the subpixels 321 are driven to update the display device 302. Further, while three display update periods are illustrated in the display frame 360, in other embodiments, other number of display update periods may be utilized. Further, the vertical blanking period 372 occurs at the beginning of the display frame 360 (e.g., before each of the display update periods 382-386), and the vertical blanking period 374 occurs at the end of the display frame 360 (e.g., after each of the display update periods 382-386).

The display update periods 382-386 include one or more display line update periods. For example, in one embodiment, the display line update periods may include a hundred or more display line update periods. In other embodiments, the display update periods may include less than or more than a hundred display line update periods. Each display line update period includes an active subpixel drive period and a horizontal blanking period. During the active subpixel drive period, the selected subpixels 321 are driven by the display driver 312 with the display update signals. During the horizontal blanking period, the subpixels 321 are not actively driven. Further, during the horizontal blanking period, the current gate line 322 is deselected, a next gate line 322 is selected, and/or the display driver circuitry 314 is reconfigured to drive the display update signals for the next display line. The active subpixel drive period is longer than the horizontal blanking time and makes up a majority of the display line update period.

The length of the display update periods 382-386 may differ from each other. For example, one or more of the display update periods 382-386 may be longer than another one of the display update periods 382-386. Alternatively, each of the display update periods 382-386 may be the same length.

The display update periods 382, 384, and 386 are separated from each other by a long horizontal blanking period (e.g., the long horizontal blanking periods 392, 394). For example, the long horizontal blanking period 392 occurs between the display update periods 382 and 384 and the long horizontal blanking period 394 occurs between the display update periods 384 and 386. While two long horizontal blanking periods are illustrated, in other embodiments, a display frame may include more or less than two long horizontal blanking periods.

Figure 3C:
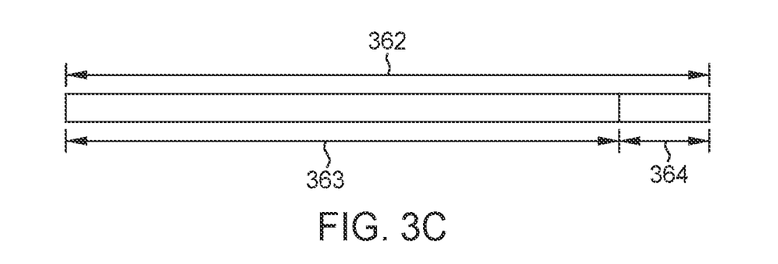
FIG. 3C illustrates a display line update period, according to one or more embodiments.

The long horizontal blanking periods 392 and 394 are longer than a display line update period (e.g., the display line update period 362 of FIG. 3C). Further, during the long horizontal blanking periods 392 and 394, the display of the display panel 320 is not updated. For example, during the long horizontal blanking periods 392 and 394, the subpixels 321 are not driven with display update signal for display updating. Accordingly, as the display of the display panel 320 is not being updated during the long horizontal blanking periods 392 and 394 and is being updated during the display update periods 382-386, the amount of interference emitted by the display device 302 during the long horizontal blanking periods 392 and 394 is less than that emitting by the display device 302 during the display update periods 382-386. In one or more embodiments, the length, starting point, and/or ending point of one or more of the long horizontal blanking periods 392 and 394 may be adjusted.

The vertical blanking periods 372 and 374 and the long horizontal blanking periods 392 and 394 may be referred to as non-display update periods as the subpixels 321 are not actively driven during these periods for updating the display device 302.

During the vertical blanking periods 372 and 374, the subpixels 321 are not driven for updating the display device 302. In one embodiment, the length of the vertical blanking periods may be adjusted to control the display frame rate. Further, during the vertical blanking periods, the display driver circuitry 314 of the display driver 312 may be configured to update the display of the display panel 320 during the next display frame.

In various embodiments, the number, order and length of the vertical blanking periods, display update periods, and/or the long horizontal blanking periods may vary between display frames.

In one or more embodiments, the display frame 360 is associated with one or more capacitive frames. For example, in one embodiment, the display frame 360 is associated with a single capacitive frame. In other embodiments, the display frame 360 is associated with two or more capacitive frames.

FIG. 3C illustrates an example display line update period 362. The display line update period 362 includes active subpixel drive period 363 and horizontal blanking period 364. In one embodiment, the display line update period 362 has a length about 9 µs, the active subpixel drive period 363 has a length of about 6 µs and the horizontal blanking period has a length of about 3 µs. Alternatively, the length of the display line update period 362 may be less than or greater than 9 µs. For example, as the resolution and/or display update frequencies (e.g., frames rates) increase, the length of the display line update period 362 may be decreased. Further in various embodiments, the length of the active pixel drive period may be greater than or less than 6 µs and/or the length of the horizontal blanking period 364 may be less than or greater than 3 µs.

With further reference to FIG. 3A, the display driver 312 receives image data from an external processor (e.g., a host processor or a timing controller) and generates the display update signals from the image data. Further, the display driver 312 generates one or more a display control signals from the image data. In other embodiments, the display driver 312 receives the display update signals and/or the control signals from the external processor.

The display control signals may include one or more pulses. In one embodiment, the display control signals include one or more of a horizontal sync signal (HSYNC), a vertical sync signal (VSYNC), data enable signal, pixel clock signal, and/or a brightness control signal. HSYNC corresponds to the start of a display line update period and/or to an end of a display line update period. Further, HSYNC additionally, or alternatively, identifies one or more blanking periods that correspond to a display line update period. VSYNC corresponds to a start and/or an end of a display frame. Further, the VSYNC signal additionally, or alternatively, identifies one or more vertical blanking periods within a display frame. The display enable signal may be a composite signal of both the HSYNC and VSYNC signal, and identifies the start time of a display frame, an end time of a display frame, horizontal blanking periods corresponding to a display line update period, and/or vertical blanking periods within a display frame.

The display driver 312 is electrically connected with the sensor driver 311 via the communication path 316. In one embodiment, the display driver 312 transmits one or more display controls signals to the sensor driver 311 via the communication path 316.

The processing system 310 includes one or more integrated circuits (IC) chips. In one embodiment, the display driver 312 and the sensor driver 311 are included within a common IC chip. In such embodiments, the communication path 316 is internal to the IC chip. In another embodiment, the display driver 312 is part of a first IC chip and the sensor driver 311 is part of a second IC chip. In such embodiments, the communication path 316 electrically connects the IC chips.

Figure 4:
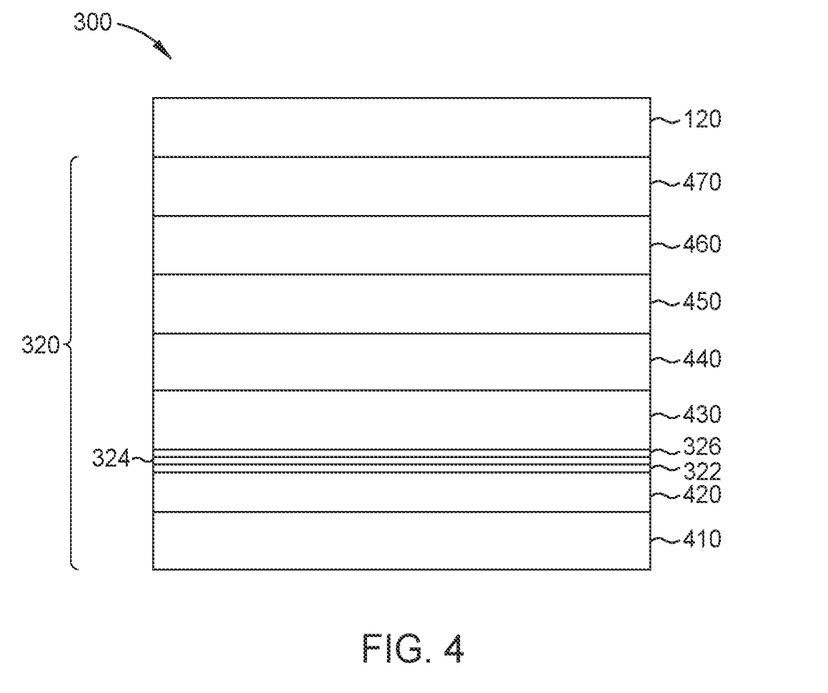
FIG. 4 is a schematic view of a stack-up of an input device, according to one or more embodiments.

FIG. 4 is a cross-sectional view of a portion of the input device 300, according to one or more embodiments. As illustrated in FIG. 4, the input device 300 includes a substrate 410, thin-film transistor (TFT) layers 420, the gate lines 322, the data lines 324, the emission control lines 326, a subpixel electrode layer 430, a display material layer 440, a reference electrode layer 450, display layers 460, an encapsulation layer 470, and the sensor electrodes 120. In one or more embodiments, the emission control lines 326 may be omitted.

The substrate 410 is a rigid substrate or a flexible substrate. In one embodiment, the substrate 410 is a plastic substrate. In other embodiments, the substrate 410 is a glass substrate. The TFT layers 420 include the subpixel circuit elements (e.g., transistors and capacitors) configured to control the selection, deselection, and driving of the subpixels 321. The gate lines 322, data lines 324, and the emission control lines 326 are disposed in one or more metal layers on the substrate 410. For example, the gate lines 322 may be disposed in a first metal layer, the data lines 324 may be disposed in a second metal layer, and the emission control lines 326 may be disposed in a third metal layer. In other embodiments, the gate lines 322 and the emission control lines 326 are disposed in a common metal layer. The gate lines 322 may be disposed in a metal layer above or below the metal layer comprising data lines 324 and/or the metal layer comprising the emission control lines 326. Alternatively, the data lines 324 may be disposed in a metal layer above or below the metal layer comprising gate lines 322 and/or the metal layer comprising the emission control lines 326.

The subpixel electrode layer 430 comprises the subpixel electrodes of each subpixel 321. In embodiments where the display device 302 is an OLED display device, the subpixels electrodes are anode electrodes. In embodiments where the display device 302 is an LCD device, the subpixels electrodes comprise LCD subpixel electrodes. The subpixel electrodes may be formed from indium tin oxide (ITO) or other suitable material.

As illustrated in FIG. 4, the display material layer 440 is disposed between the subpixel electrode layer 430 and the reference electrode layer 450. However, in other embodiments, the display material layer 440 may be disposed above the subpixel electrode layer 430 and the reference electrode layer 450. In embodiments where the display device 302 is an OLED display device, the display material layer 440 is an organic material layer. Further, in such embodiments, the display material layer 440 is disposed between the subpixel electrode layer 430 and the reference electrode layer 450. In embodiments where the display device 302 is an LCD device, the display material layer 440 is a liquid crystal material. In such embodiments, the display material layer 440 is disposed between the subpixel electrode layer 430 and the reference electrode layer 450 or above the subpixel electrode layer 430 and the reference electrode layer 450.

The reference electrode layer 450 overlaps the subpixels electrodes of the subpixel electrode layer 430 and acts as a reference against which the subpixels of the subpixel electrode layer 430 are driven to update the subpixels 321. For example, the reference electrode layer 450 may be a cathode electrode layer or a common voltage (Vcom) electrode layer. In embodiments where the display device 302 is an OLED display device, the reference electrode layer 450 is a cathode electrode. The cathode electrode is a sheet of resistive material. In one or more embodiment, the cathode electrode is a resistive sheet having a resistance of about 1 to about 20 ohms per square. In one embodiment, the cathode electrode may be comprised of a single electrode or multiple electrodes. The cathode electrode is electrically connected with and driven by the display driver 312 to supply a low impedance reference voltage against which the subpixel electrodes of the subpixel electrode layer 430 are driven.

In embodiments where the display device 302 is an LCD display device, the reference electrode layer 450 is a Vcom electrode layer. The Vcom electrode layer may comprise one or more Vcom electrodes. The Vcom electrode layer is electrically connected with and driven by the display driver 312 to supply a reference voltage against which the subpixels electrodes of the subpixel electrode layer 430 are driven.

The display layers 460 may include one or more polarizers, one or more substrates, and/or a color filter glass, among others.

The encapsulation layer 470 is disposed over the other layers of the display device 302. The encapsulation layer 470 may be rigid or flexible. Further, in one or more embodiments, the encapsulation layer 470 may be omitted and a lens may be included instead. For example, in embodiments where the display panel 320 is an LCD display panel, the encapsulation layer 470 may be replaced with a lens disposed over the layers of the display device 302. In one or more embodiments, a lens may be included in addition to and over the encapsulation layer 470.

One or more of the sensor electrodes 120 may be disposed on the encapsulation layer 470. For example, one or more of the sensor electrodes 120 is disposed on the encapsulation layer 470. In embodiment including a lens, one or more of the sensor electrodes 120 is disposed on the lens. Further, one or more of the sensor electrodes 120 may be disposed on a substrate, or substrates, and adhered to the display panel 320 (e.g., adhered to the encapsulation layer 470 or a lens). In one embodiment, one or more sensor electrodes 120 are disposed on the encapsulation layer 470 or a lens, and a second one or more sensor electrodes 120 are disposed on a substrate which is adhered to the display panel 320.

Figure 5:
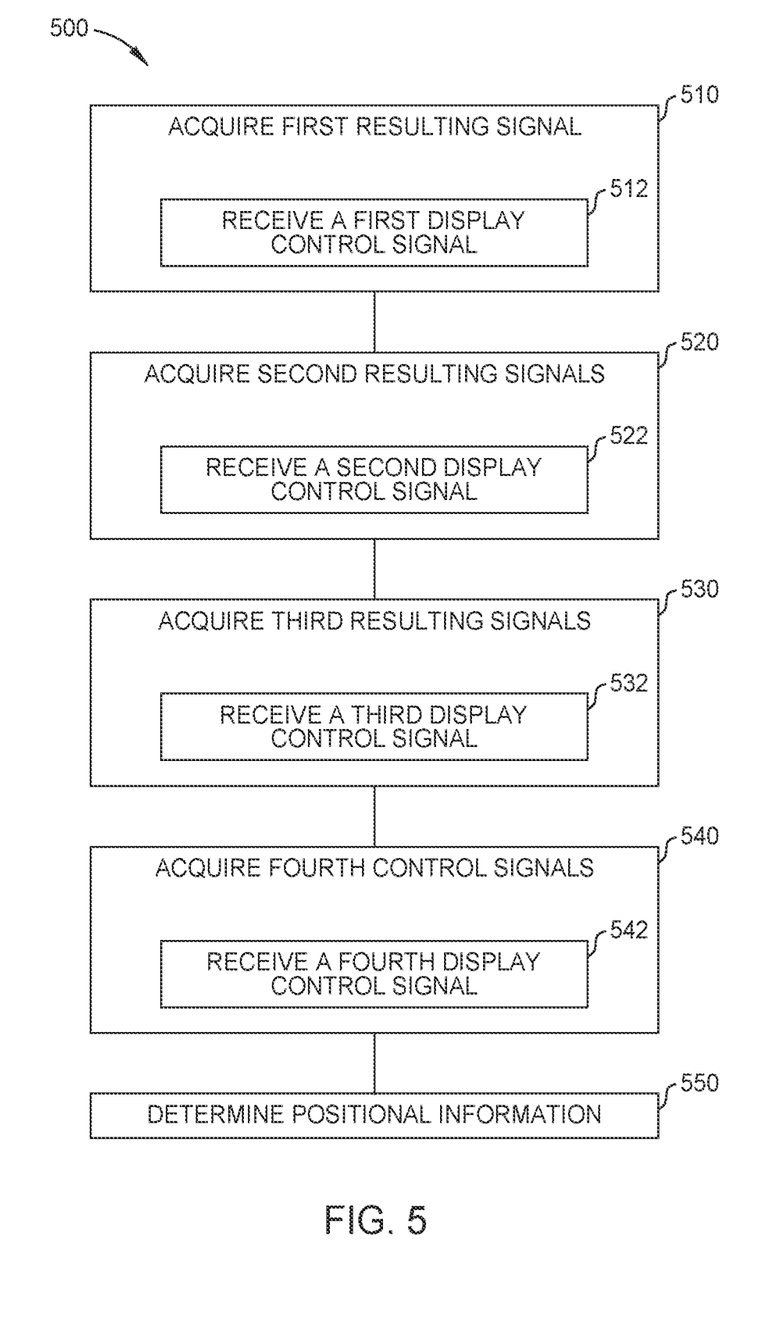
FIG. 5 is a flow chart illustrating a method for capacitive sensing, according one or more embodiments.

FIG. 5 is a flowchart illustrating a method 500 for performing input sensing, according one or more embodiments. At operation 510, the sensor driver 311 acquires first resulting signals from the sensor electrodes 120. For example, the sensor driver 311 may operate the sensor electrodes 120 for absolute capacitive sensing, transcapacitive sensing, and/or active pen sensing to receive the first resulting signals.

The operation 510 includes the operation 512, receiving a first display control signal. For example, at operation 512, the sensor driver 311 receives a first display control signal indicative of a beginning of a display frame. In one embodiment, the first display control signal is indicative of a non-display update period (e.g., vertical blanking period or long horizontal blanking period) of a display frame.

With reference to FIG. 3A, a display control signal is communicated from the display driver 312 to the sensor driver 311 via the communication path 316 at the beginning of the display frame 360. The first display control signal may include one or more pulses. In one or more embodiments, the first display signal may be a VSYNC signal or be based on a VSYNC signal. Alternatively, the first display control signal may be an HSYNC signal or based on an HSYNC signal.

The sensor driver 311, based on receipt of the first display control signal, initiates the acquisition of the first resulting signals. For example, the sensor driver 311 may initiate the acquisition of the first resulting signals based on a pulse of the first display control signal. In one embodiment, initiating acquisition of the first resulting signal based on the pulse of the first display control signal comprises detecting a rising edge of a pulse of the first display control signal and initiating acquisition of the first resulting signals based on the detection of the rising edge of the pulse of the first display control signal. Initiating the acquisition of the first resulting signals comprises operating the sensor electrodes 120 for transcapacitive sensing, absolute capacitive sensing, or active pen sensing.

In one embodiment, during operation 510, the sensor driver 311 operates one or more of the sensor electrodes 120 for absolute capacitive sensing during a period of time that overlaps with a non-display update period of the display frame 360. For example, the sensor driver 311 operates one or more of the sensor electrodes 120 for absolute capacitive sensing during a period of time that overlaps with the vertical blanking period 372 or the long horizontal blanking period 392. Operating one or more of the sensor electrodes 120 for absolute capacitive sensing includes operating each of the sensor electrodes 120 for absolute capacitive sensing, operating each of the sensor electrodes 120a or 120b for absolute capacitive sensing, or operating less than all of the sensor electrodes 120a or 120b for absolute capacitive sensing. Further, operating one or more of the sensor electrodes 120 for absolute capacitive sensing comprises driving the one or more of the sensor electrodes 120 with an absolute capacitive sensing signal while receiving resulting signals with the driven one or more sensor electrodes 120.

In one embodiment, during operation 510, the sensor driver 311 operates one or more of the sensor electrodes 120 for transcapacitive sensing during a period of time that overlaps with a non-display update period of the display frame 360. For example, the sensor driver 311 operates two or more of the sensor electrodes 120 for transcapacitive sensing during a period of time that overlaps with the vertical blanking period 372 or the long horizontal blanking period 392. Operating one or more of the sensor electrodes 120 for transcapacitive sensing includes operating each of the sensor electrodes 120 for transcapacitive sensing, operating each of the sensor electrodes 120a or 120b for transcapacitive sensing, or operating less than all of the sensor electrodes 120a or 120b for transcapacitive sensing. Further, operating one or more of the sensor electrodes 120 for transcapacitive sensing comprising driving a first one or more of the sensor electrodes 120 with a transcapacitive sensing signal while receiving resulting signals with a second one or more of the more sensor electrodes 120.

In one embodiment, during operation 510, the sensor driver 311 operates one or more of the sensor electrodes 120 for active pen sensing during a period of time that overlaps with a non-display update period of the display frame 360. For example, the sensor driver 311 operates one or more of the sensor electrodes 120 for active pen sensing during a period of time that overlaps with the vertical blanking period 372 or the long horizontal blanking period 392. Operating one or more of the sensor electrodes 120 for active pen sensing includes operating each of the sensor electrodes 120 for active pen sensing, operating each of the sensor electrodes 120a or 120b for active pen sensing, or operating less than all of the sensor electrodes 120a or 120b for active pen sensing. For example, operating one or more of the sensor electrodes 120 for active pen sensing includes driving one or more of the sensor electrodes 120 with a substantially constant voltage to receive the active pens signal.

The operation 520 includes operation 522 which comprises receiving a second display control signal. For example, at operation 522, the sensor driver 311 receives a second display control signal indicative of a beginning of a display update period of a display frame.

With reference to FIG. 3A, a second display control signal is communicated from the display driver 312 to the sensor driver 311 via the communication path 316 at the beginning of the display update period 382. The second display control signal may include one or more pulses. In one or more embodiments, the second display signal is a VSYNC signal or is based on a VSYNC signal. Alternatively, the second display control signal is an HSYNC signal or based on an HSYNC signal.

The sensor driver 311, based on receipt of the second display control signal, initiates the acquisition of the second resulting signals. For example, the sensor driver 311 initiates the acquisition of the second resulting signals based on a pulse of the second display control signal. In one embodiment, initiating acquisition of the second resulting signal based on the pulse of the second display control signal comprises detecting a rising edge of a pulse of the second display control signal and initiating acquisition of the second resulting signals based on the detection of the rising edge of the pulse of the second display control signal. Further, initiating the acquisition of the second resulting signals comprises operating the sensor electrodes 120 for transcapacitive sensing, absolute capacitive sensing, or active pen sensing.

In one embodiment, during operation 520, the sensor driver 311 operates one or more of the sensor electrodes 120 for absolute capacitive sensing during a period of time that overlaps with a display update period of the display frame 360.

In one embodiment during operation 520, the sensor driver 311 operates one or more of the sensor electrodes 120 for transcapacitive sensing during a period of time that overlaps with a display update period of the display frame 360.

In another embodiment during operation 520, the sensor driver 311 operates one or more of the sensor electrodes 120 for active pen sensing during a period of time that overlaps with a display update period of the display frame 360.

In one or more embodiments during operations 510 and 520, the sensor driver 311 operates the sensor electrodes 120 for a first type and a second type of input sensing. For example, during operation 510, the sensor driver 311 operates the sensor electrodes 120 for absolute capacitive sensing or active pen sensing, and during operation 520, the sensor driver 311 operates the sensor electrodes 120 for transcapacitive sensing.

The operation 530 includes operation 532 which comprises receiving a third display control signal. For example, at operation 532, the sensor driver 311 receives a third display control signal indicative of a beginning of a non-display update period of a display frame. In one embodiment, the third display control signal is indicative of a beginning a long horizontal blanking period a display frame. Optionally, the operation 530 may be omitted from the method 500.

With reference to FIG. 3A, a third display control signal is communicated from the display driver 312 to the sensor driver 311 at the beginning of the end of the display update period 382 or at the beginning of a long horizontal blanking period 392. The third display control signal may include one or more pulses. In one or more embodiments, the third display signal may be an HSYNC signal or based on an HSYNC signal.

The sensor driver 311, based on receipt of the third display control signal, initiates the acquisition of the third resulting signals. For example, the sensor driver 311 initiates the acquisition of the third resulting signals based on a pulse of the third display control signal. In one embodiment, initiating acquisition of the third resulting signal based on the pulse of the third display control signal comprises detecting a rising edge of a pulse of the third display control signal and initiating acquisition of the third resulting signals based on the detection of the rising edge of the pulse of the third display control signal. Further, initiating the acquisition of the third resulting signals comprises operating the sensor electrodes 120 for transcapacitive sensing, absolute capacitive sensing, or active pen sensing.

In one embodiment during operation 530, the sensor driver 311 operates one or more of the sensor electrodes 120 for absolute capacitive sensing during a period of time that at least partially overlaps with the long horizontal blanking period 392 of the display frame 360.

In other embodiments during operation 530, the sensor driver 311 operates one or more of the sensor electrodes 120 for transcapacitive sensing during a period of time that at least partially overlaps with the long horizontal blanking period 392 of the display frame 360.

In one or more embodiments during operation 530, the sensor driver 311 operates one or more of the sensor electrodes 120 for active pen sensing during a period of time that at least partially overlaps with the long horizontal blanking period 392 of the display frame 360.

In various embodiments during operation 520, the sensor driver 311 operates the sensor electrodes 120 for a first type of input sensing and, during operation 530, the sensor driver 311 operates the sensor electrodes 120 for a second type of input sensing. For example, during operation 520, the sensor driver 311 operates the sensor electrodes 120 for transcapacitive sensing, and, during operation 530, the sensor driver 311 operates the sensor electrodes 120 for absolute capacitive sensing or active pen sensing.

The operation 540 includes operation 542 which comprises receiving a fourth display control signal. For example, at operation 542, the sensor driver 311 receives a fourth display control signal indicative of a beginning of a display update period of a display frame. In one embodiment, the fourth display control signal is indicative of an end of a non-display update period of a display frame. Optionally, the operation 540 may be omitted from the method 500.

With reference to FIG. 3A, a fourth display control signal is communicated from the display driver 312 to the sensor driver 311 at the beginning of the display update period 384. The fourth display control signal may include one or more pulses. In one or more embodiments, the fourth display signal is a VSYNC signal or is based on a VSYNC signal. Alternatively, the fourth display control signal is an HSYNC signal or based on an HSYNC signal.

The sensor driver 311, based on receipt of the fourth display control signal, initiates the acquisition of the fourth resulting signals. For example, the sensor driver 311 initiates the acquisition of the fourth resulting signals based on a pulse of the fourth display control signal. In one embodiment, initiating acquisition of the fourth resulting signal based on the pulse of the fourth display control signal comprises detecting a rising edge of a pulse of the fourth display control signal and initiating acquisition of the fourth resulting signals based on the detection of the rising edge of the pulse of the fourth display control signal. Further, initiating the acquisition of the fourth resulting signals comprises operating one or more of the sensor electrodes 120 for transcapacitive sensing, absolute capacitive sensing, or active pen sensing.

In one embodiment during operation 540, the sensor driver 311 operates one or more of the sensor electrodes 120 for absolute capacitive sensing during a period of time that overlaps with the display update period 384 of the display frame 360.

In one or more embodiments during operation 540, the sensor driver 311 operates one or more of the sensor electrodes 120 for transcapacitive sensing during a period of time that overlaps with the display update period of the display frame 360.

In various embodiments during operation 540, the sensor driver 311 operates one or more of the sensor electrodes 120 for active pen sensing during a period of time that overlaps with the display update period 384 of the display frame 360.

During operations 520 and 540, the sensor driver 311 operates the sensor electrodes 120 for the same type of input sensing. For example, the sensor driver 311 operates the sensor electrodes 120 for transcapacitive sensing during operations 520 and 540. Further, the sensor driver 311 operates the sensor electrodes 120 for absolute capacitive sensing and/or active pen sensing during operations 520 and 540.

At operation 550, the determination module 114 determines positional information for one or more input objects (e.g., the input object 140) based on one or more of the first, second, third, and fourth resulting signals. For example, the determination module 114 determines changes in capacitance between the sensor electrodes 120 and/or between the sensor electrodes 120 and the input object 140 and/or parameters of an active pens signal from the first, second, third, and fourth resulting signals.

In one or more embodiments, the determination module 114 compares two or more of the first, second, third, and fourth resulting signals to determine positional information for one or more input objects 140. For example, in embodiments where absolute capacitive sensing is performed during the operation 510 and transcapacitive sensing is performed during operation 520, the determination module 114 compares the first resulting signals with the second resulting signals to determine positional information for the input object 140. In such embodiments, the first resulting signals may be received during a period of time free from interference due to updating the display device. Further in such embodiments, the second resulting signals are received during a period of time when interference due to updating the display is present. Accordingly, the first resulting signals is utilized to mitigate interference within the second resulting signals. For example, the first resulting signals is utilized to confirm the detection of one or more input objects detecting using the second resulting signals. In other examples, other interference mitigation techniques may be performed based on the first and second resulting signals.

Further, the determination module 114 determines first positional information from the first resulting signals and second positional information from the second resulting signals. The determination module 114 compares the first and a second positional information to mitigate interference within the second positional information. For example, the first positional information is compared against the second positional information to determine whether or not detected input objects in the second positional information are valid. Non-valid input objects may be referred to as ghost input objects.

Ghost input objects refer to the incorrect determination of input objects within the sensing region of the input device (e.g., the input device 100). The presence of ghost input objects may be caused by the effects of display interference on the second resulting signals. However, as the first resulting signals are free from display interference, the first resulting signals (or positional information determined from the first resulting signals) may be used to detect whether or not ghost input objects exist in the second resulting signals (or positional information determined from the second resulting signals) based on a comparison of the first and second resulting signals (or positional information determined form the first and second resulting signals). If the number of and location of input objects identified by the resulting signals (or the positional information determined from the first resulting signals) corresponds to the number of and location of input objects identified by the second resulting signals (or the positional information generated from the second resulting signals), the second resulting signals (or the positional information determined from the second resulting signals) is determined to be valid and/or associated with a high confidence value. The confidence value corresponds to the likelihood that each identified input object is a valid input object (e.g., a valid detection of an input object). However, if the number of and location of input objects identified by the first resulting signals (or positional information determined from the first resulting signals) does corresponds to the number of and location of input objects identified by the second resulting signals (or positional information determined from the second resulting signals), the second resulting signals (or positional information determined from the second resulting signals) is determined to not be valid and/or associated with a low confidence value. Accordingly, the second resulting signals may undergo additional filtering by the determination module 114 or may be ignored.

In various embodiments, the first and second resulting signals may refer to a first capacitive frame and the third and fourth resulting signal refer to a second capacitive frame. In such an embodiment, the third resulting signals may be utilized to confirm the positional information of input objects in the fourth resulting signals similar to how the first resulting signals may be utilized to confirm the positional information of input objects in the second resulting signals.

In embodiments where active pen sensing is performed during the operations 510 and/or 530, the determination module 114 determines positional information for the active pen based on the first and/or third resulting signals. In one embodiment, the determination module 114 determines duty cycle of the active pen signal from the first and/or third resulting signals and adjusts a corresponding non-display update time based on the duty cycle. For example, the determination module 114 may alter a starting point for subsequent long horizontal blanking period (e.g., the long horizontal blanking period 394 within the display frame 360 or a long horizontal blanking period of a subsequent display frame) based on the third resulting signals. In one embodiment, altering the starting point for the long horizontal blanking period 394 comprises instructing the display driver 312 to start the long horizontal blanking period 394 earlier or later within the display frame 360. Alternatively, the length of a subsequent long horizontal blanking period (e.g., the long horizontal blanking period 394 within the display frame 360 or a long horizontal blanking period of a subsequent display frame) may be increased or decreased based on the duty cycle of the active pen signal determined from the third resulting signals.

In one or more embodiments, the determination module 114 detects one or more input objects in a sensing region of an input device, but not in contact with an input surface of the input device 100 based on the first and/or third resulting signals. For example, in embodiments where the first and/or third resulting signals are acquired using absolute capacitive sensing, the determination module 114 determines corresponding first and/or third positional information from the first and/or third resulting signals. In such embodiments, the first and/or third positional information may be utilized to detect an input object within the sensing region of an input device, but not in contact with the input device. Further, in such embodiments, the first and/or third resulting signals may be utilized to detect an input object entering or leaving the sensing region of the input device.

Thus, the embodiments and examples set forth herein were presented to explain the present technology and applications, and to enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A processing system comprising:
a sensor driver configured to:
receive a first display control signal corresponding to a non-display update period of a display frame and a second display control signal corresponding to a display update period of the display frame;
acquire, based on the first display control signal, first resulting signals with sensor electrodes electrically connected to the sensor driver by operating the sensor electrodes for a first type of input sensing during a first period, wherein the first period overlaps with at least a portion of the non-display update period; and
acquire, based on the second display control signal, second resulting signals with the sensor electrodes by operating the sensor electrodes for a second type of input sensing during a second period, wherein the second period overlaps with at least a portion of the display update period.

2. The processing system of claim 1, wherein operating the sensor electrodes for the first type of input sensing comprises driving one or more of the sensor electrodes with an absolute capacitive sensing signal.

3. The processing system of claim 1, wherein operating the sensor electrodes for the first type of input sensing comprises driving one or more of the sensor electrodes with a transcapacitive sensing signal.

4. The processing system of claim 1, wherein operating the sensor electrodes for the first type of input sensing comprises operating a first one or more of the sensor electrodes for active pen sensing.

5. The processing system of claim 1, further comprising a determination circuit configured to mitigate interference based on a comparison of first positional information determined from the first resulting signals and second positional information determined from the second resulting signals.

6. The processing system of claim 5, wherein mitigating the interference comprises determining a valid detection of an input object.

7. The processing system of claim 1, wherein the sensor driver is further configured to receive a third display control signal corresponding to a second non-display update period of the display frame, wherein a timing of the third display control signal is adjusted at least partially based on the first resulting signals.

8. A method for input sensing comprising:
   receiving, at a sensor driver, a first display control signal corresponding to a nondisplay update period of a display frame and a second display control signal corresponding to a display update period of the display frame;
   acquiring, based on the first display control signal, first resulting signals with sensor electrodes by operating the sensor electrodes for a first type of input sensing during a first period, wherein the first period overlaps with at least a portion of the non-display update period; and
   acquiring, based on the second display control signal, second resulting signals with the sensor electrodes by operating the sensor electrodes for a second type of input sensing during a second period, wherein the second period overlaps with at least a portion of the display update period.

9. The method of claim 8, wherein operating the sensor electrodes for the first type of input sensing comprises driving one or more of the sensor electrodes with an absolute capacitive sensing signal.

10. The method of claim 8, wherein operating the sensor electrodes for the first type of input sensing comprises driving one or more of the sensor electrodes with a transcapacitive sensing signal.

11. The method of claim 8, wherein operating the sensor electrodes for the first type of input sensing comprises operating a first one or more of the sensor electrodes for active pen sensing.

12. The method of claim 8, further comprising mitigating interference based on a comparison of first positional information determined from the first resulting signals and second positional information determined from the second resulting signals.

13. The method of claim 12, wherein mitigating the interference comprises determining a valid detection of an input object.

14. An input device comprising:
   sensor electrodes; and
   a processing system electrically connected to the sensor electrodes and configured to:
   receive a first display control signal corresponding to a non-display update period of a display frame and a second display control signal corresponding to a display update period of the display frame;
   acquire, based on the first display control signal, first resulting signals with the sensor electrodes by operating the sensor electrodes for a first type of input sensing during a first period, wherein the first period overlaps with at least a portion of the non-display update period; and
   acquire, based on the second display control signal, second resulting signals with the sensor electrodes by operating the sensor electrodes for a second type of input sensing during a second period, wherein the second period overlaps with at least a portion of the display update period.

15. The input device of claim 14, wherein operating the sensor electrodes for the first type of input sensing comprises driving one or more of the sensor electrodes with an absolute capacitive sensing signal.

16. The input device of claim 14, wherein operating the sensor electrodes for the first type of input sensing comprises driving one or more of the sensor electrodes with a transcapacitive sensing signal.

17. The input device of claim 14, wherein operating the sensor electrodes for the first type of input sensing comprises operating a first one or more of the sensor electrodes for active pen sensing.

18. The input device of claim 14, wherein the processing system is further configured to mitigate interference based on a comparison of first positional information determined from the first resulting signals and second positional information determined from the second resulting signals.

19. The input device of claim 18, wherein mitigating the interference comprises determining a valid detection of an input object.

20. The input device of claim 14, further comprising a display device comprising display electrodes, wherein the processing system is configured to drive the display electrodes to update the display electrodes during the display update period.

* * * * *